(12) United States Patent
Duncum et al.

(10) Patent No.: US 7,919,437 B2
(45) Date of Patent: Apr. 5, 2011

(54) WELLBORE FLUID COMPRISING SULFONATED COPOLYMERS WITH PENDANT ALKYL GROUPS

(75) Inventors: Simon Neil Duncum, Bracknell (GB); Christopher Alan Sawdon, Par (GB)

(73) Assignee: BP Exploration Operating Company Limited, Middlesex (GB)

( * ) Notice: Subject to any disclaimer, the term of this patent is extended or adjusted under 35 U.S.C. 154(b) by 137 days.

(21) Appl. No.: 12/308,760

(22) PCT Filed: Jun. 21, 2007

(86) PCT No.: PCT/GB2007/002323
§ 371 (c)(1),
(2), (4) Date: Dec. 23, 2008

(87) PCT Pub. No.: WO2008/001049
PCT Pub. Date: Jan. 3, 2008

(65) Prior Publication Data
US 2009/0247428 A1 Oct. 1, 2009

(30) Foreign Application Priority Data

Jun. 26, 2006 (EP) .................................. 06253321

(51) Int. Cl.
*C09K 8/22* (2006.01)
*E21B 7/00* (2006.01)
*E21B 43/16* (2006.01)

(52) U.S. Cl. ....... 507/117; 166/305.1; 175/65; 507/118; 507/119; 507/120; 507/219; 507/221; 507/224; 507/225

(58) Field of Classification Search .................. 507/119, 507/117, 118, 120, 219, 221, 224, 225; 166/305.1; 175/65
See application file for complete search history.

(56) References Cited

U.S. PATENT DOCUMENTS

| | | |
|---|---|---|
| 2,826,548 A | 3/1958 | Busch |
| 2,847,403 A | 8/1958 | Contois |
| 2,938,016 A | 5/1960 | Johnson |
| 2,948,678 A | 8/1960 | Turner et al. |
| 2,948,768 A | 8/1960 | Ruben |
| 2,979,454 A | 4/1961 | Fields et al. |
| 3,222,278 A | 12/1965 | Harryman et al. |
| 3,472,769 A | 10/1969 | Lummus et al. |
| 3,816,308 A | 6/1974 | Le Blanc |
| 3,838,047 A | 9/1974 | Le Blanc |
| 3,896,031 A | 7/1975 | Carney |
| 4,008,766 A | 2/1977 | Savins |
| 4,008,768 A | 2/1977 | Birk |
| 4,143,007 A | 3/1979 | DeMartino |
| 4,306,980 A | 12/1981 | Brandt et al. |
| 4,317,893 A | 3/1982 | Chen et al. |
| 4,505,827 A | 3/1985 | Rose et al. |
| 4,507,827 A | 4/1985 | Staehli |
| 4,518,510 A | 5/1985 | Gleason et al. |
| 4,532,052 A | 7/1985 | Weaver et al. |
| 4,551,256 A | 11/1985 | Kita et al. |
| 4,566,978 A | 1/1986 | Strong et al. |
| 4,581,147 A | 4/1986 | Branch, III |
| 4,602,067 A | 7/1986 | Strong et al. |
| 4,652,623 A | 3/1987 | Chen et al. |
| 4,703,801 A | 11/1987 | Fry et al. |
| 4,726,906 A | 2/1988 | Chen et al. |
| 4,740,318 A | 4/1988 | Hale et al. |
| 4,812,544 A | 3/1989 | Sopko et al. |
| 4,829,121 A | 5/1989 | Fong et al. |
| 4,861,499 A | 8/1989 | Neff et al. |
| 4,976,315 A | 12/1990 | Prukop et al. |
| 5,039,433 A | 8/1991 | Sopko et al. |
| 5,096,603 A | 3/1992 | Peiffer |
| 5,166,275 A | 11/1992 | Enomoto et al. |
| 5,191,049 A | 3/1993 | Enomoto et al. |
| 5,210,163 A | 5/1993 | Grey |
| 5,221,489 A | 6/1993 | Bloys et al. |
| 5,229,449 A | 7/1993 | Enomoto et al. |
| 5,283,235 A | 2/1994 | Bush et al. |
| 5,287,929 A | 2/1994 | Bloys et al. |
| 5,292,367 A | 3/1994 | Bloys et al. |
| 5,294,693 A | 3/1994 | Egraz et al. |
| 5,360,787 A | 11/1994 | Bloys et al. |

(Continued)

FOREIGN PATENT DOCUMENTS

GB 2 001 377 1/1979
(Continued)

OTHER PUBLICATIONS

Chevron Phillips Chemical Company LLC: "Polyanhydride Resins", Internet Article, [Online], (2005), 4 pages. International Search Report for PCT/GB2007/002323mailed Oct. 5, 2007.
Written Opinion of the International Searching Authority for PCT/GB2007/002323mailed Oct. 5, 2007.

Primary Examiner — Timothy J. Kugel
(74) Attorney, Agent, or Firm — Nixon & Vanderhye

(57) ABSTRACT

Wellbore fluid having a continuous aqueous phase, and comprising at least one polymer which has a number average molecular weight in the range of from 10,000 to less than 100,000, wherein the polymer is selected from a copolymer of at least one hydrophilic monomer and at least one hydrophobic monomer containing an alkyl group having at least 8 carbon atoms. The hydrophilic monomer is selected from acrylic acid, methacrylic acid, maleic acid, maleic anhydride, fumaric acid and itaconic acid, and sulfonate groups have been introduced into the copolymer by reaction of at least a portion of the carboxylic acid and/or anhydride groups with a compound of general formula $R^1{}_2N(CH_2)_nSO_3X$ (I) or a compound of general formula $HO(CH_2)_nSO_3X$ (II). Each $R^1$ is independently selected from hydrogen, methyl or ethyl, X is either H or a Group IA metal, and n is an integer of from 1 to 6. The combined molecular weight of the pendant alkyl groups that are introduced into the copolymer by the hydrophobic monomer is in the range of from 15 to 70% by weight based on the molecular weight of the polymer such that the polymer has a solubility of at least 2% in water at 20° C. The fluid further comprises at least one additive selected from additional fluid loss control agents, bridging particulate materials, finely dispersed additives for increasing the fluid density, thinners, and shale inhibitors.

21 Claims, No Drawings

U.S. PATENT DOCUMENTS

| | | |
|---|---|---|
| 5,391,359 A | 2/1995 | Patel |
| 5,728,653 A | 3/1998 | Audibert et al. |
| 5,759,962 A | 6/1998 | Audibert et al. |
| 6,770,604 B2 | 8/2004 | Reddy et al. |
| 6,822,039 B1 | 11/2004 | Monfreux-Gaillard et al. |
| 2003/0114317 A1* | 6/2003 | Benton et al. .......... 507/200 |
| 2004/0220058 A1 | 11/2004 | Eoff et al. |
| 2004/0244978 A1 | 12/2004 | Shaarpour |
| 2005/0155796 A1 | 7/2005 | Eoff et al. |
| 2005/0215438 A1 | 9/2005 | Prud'Homme et al. |
| 2005/0284632 A1 | 12/2005 | Dalrymple et al. |

FOREIGN PATENT DOCUMENTS

| | | |
|---|---|---|
| GB | 2 340 521 | 2/2000 |
| WO | WO 91/16365 | 10/1981 |
| WO | WO 87/02692 | 5/1987 |
| WO | WO 98/23843 | 6/1998 |
| WO | WO 00/22009 | 4/2000 |
| WO | WO 03/012004 | 2/2003 |
| WO | WO 03/052024 | 6/2003 |
| WO | WO 03/056130 | 7/2003 |
| WO | WO 2005/105949 | 11/2005 |

* cited by examiner

WELLBORE FLUID COMPRISING SULFONATED COPOLYMERS WITH PENDANT ALKYL GROUPS

This application is the U.S. national phase of International Application No. PCT/GB2007/002323, filed 21 Jun. 2007, which designated the U.S. and claims priority to Europe Application No. 06253321.1, filed 26 Jun. 2006, the entire contents of each of which are hereby incorporated by reference.

The present invention relates to a low fluid loss aqueous-based wellbore fluid, for example, a drilling fluid, completion fluid, workover fluid or packer fluid.

Conventionally, the drilling of a well into the earth by rotary drilling techniques, involves the circulation of a drilling fluid from the surface of the earth down a drill string having a drill bit on the lower end thereof and through ports provided in the drill bit to the well bottom and thence back to the surface through the annulus formed about the drill string. The drilling fluid serves to cool the drill bit, to transport drill cuttings to the surface, and to stabilize the wellbore.

A problem often encountered in the drilling of a well is the loss of unacceptably large amounts of drilling fluid into subterranean formations penetrated by the well. This problem is often referred to generally as "lost circulation", and the formations into which the drilling fluid is lost are often referred to as "lost circulation zones" or "thief zones". Various causes may be responsible for the lost circulation encountered in the drilling of a well. For example, a formation penetrated by the well may exhibit unusually high permeability or may contain fractures or crevices therein. In addition, a formation may simply not be sufficiently competent to support the pressure applied by the drilling fluid and may break down under this pressure and allow the drilling fluid to flow thereinto.

An additional problem associated with drilling through a high permeability formation using a drill bit attached to the lower end of a drill string is that occasionally the drill string becomes stuck and cannot be raised, lowered or rotated. There are numerous causes for this problem, one of the most common being differential sticking. Differential sticking usually occurs when drilling through a permeable formation where the borehole pressure is greater than the formation pressure and when the drill pipe remains at rest against the wall of the borehole for enough time to allow a filter cake comprised of drilling fluid solids to build up around the pipe. The pressure exerted by the drilling fluid then holds the pipe against the filter cake. A reduction in fluid loss from a drilling fluid would reduce the thickness of the filter cake, thus reducing the incidence of differential sticking.

Damage (productivity loss) is caused by the invasion of fluids into producing formations associated with the loss of filtrate from drilling fluids and from other types of wellbore fluids such as completion fluids, workover fluids and packer fluids. It would therefore be desirable to reduce the fluid loss from a wellbore fluid into a subterranean formation, in particular, the fluid loss from a drilling fluid into a subterranean formation.

Wellbore fluid compositions, in particular drilling fluid compositions are known to be flowable systems that are generally thickened to a limited extent. Wellbore fluids can be assigned to one of the three following classes: wellbore fluids based on oil, which as a rule are used in the form of so-called invert emulsion fluids, and represent preparations of the water-in-oil emulsion type in which the aqueous phase is distributed as a heterogeneous fine dispersion in the continuous oil phase; purely aqueous based wellbore fluids; and aqueous based wellbore fluids of the oil-in-water emulsion type in which the oil phase is distributed as a heterogeneous fine dispersion in a continuous aqueous phase. A disadvantage of wellbore fluids based on oil is that the oil tends to coat the drill cuttings which creates an environmental problem, especially in offshore drilling operations, when the drill cuttings are discarded. To avoid serious pollution, the oil must be cleaned from the cuttings before they can be dumped. It is difficult and expensive to reduce the oil contamination to currently permitted levels, but even these small amounts of residual oil are ecologically undesirable, and there is pressure to replace oil based wellbore fluids with aqueous based ones. However, the technical properties and attributes of aqueous based fluids are significantly different from those of oil based fluids, and the challenges of developing aqueous based fluids are considerable. The present invention relates to improved aqueous based systems, that is, systems having a continuous aqueous phase, i.e. either purely aqueous based fluids, or oil-in-water emulsions.

Wellbore fluids often contain polymers performing various functions. Polymers are commonly added in order to modify the various properties of the fluid, for example, to increase the viscosity of the fluid. For example, WO 2005/105949 discloses a drilling fluid composition comprising a non-aqueous base fluid, a blend of one or more copolymers, and polyethylene. The combined use of the polyethylene and a copolymer leads to improved flow properties and gel strengths. The technology is only applicable to non-aqueous based fluids.

We have now found that, by use of a particular type of polymer in which the structure of the polymer has a particular combination of features, including the presence of sulfonate groups, significant improvement of fluid loss can be obtained in aqueous based fluids. Such polymers are known, for example from WO 00/22009, but their use in wellbore fluids is not known or suggested in the art.

Accordingly, the present invention provides a wellbore fluid having a continuous aqueous phase, and comprising at least one polymer which contains both hydrophilic units and hydrophobic units, at least some of said hydrophilic units containing sulfonate groups, and less than 50% by weight of said hydrophilic units comprising —$CH_2.CH_2.O$— units; and at least some of said hydrophobic units containing pendant alkyl groups having at least 8 carbon atoms.

Many polymers used as additives in wellbore fluids in the prior art have very high molecular weights, often specifically designed to increase the viscosity of the fluid, or even to produce a gel. In contrast, the polymers used in the present invention preferably have a relatively low molecular weight, for example a number average molecular weight in the range of from 2,000 to 100,000, preferably less than 90,000, especially less than 60,000. The minimum molecular weight is preferably 2,000, and the preferred molecular weight is at least 10,000, for example from 10,000 to 55,000.

Viscosity of a system containing a polymer is generally a function of molecular weight, low molecular weight materials generally leading to a correspondingly low viscosity. The polymers used in the present invention are expressly intended to provide a relatively low viscosity: preferably, they are such that the viscosity of a 5% by weight solution of the polymer in fresh water at a temperature of 20° C. and at a pH between 10 and 12 is no greater than 50 cP, preferably no greater than 25 cP, as measured using a Fann 35 rheometer at 300 rpm rotor speed.

The polymers used in the fluids of the invention contain hydrophilic units to ensure sufficient solubility in water. Polymers based upon ethylene oxide contain —$CH_2.CH_2.O$— units and have undesirable properties in that they become water insoluble under the conditions of high temperature and high salinity frequently experienced by wellbore fluids. The ether oxygen atoms are hydrophilic and solvated by water at (say) room temperature, but they dehydrate at about 100° C., causing phase separation of the polymer. Another example is discussed by Wu et al, J. Phys.: Condens. Matter 18 (2006) 4461-4471, which shows that high temperatures cause phase separation of the polymer, the effect being exacerbated by the addition of salt. Polymers that substantially rely on —$CH_2.CH_2.O$— units as hydrophilic moieties are thus unsuitable for this invention. The polymers used in the present invention are characterised in that less than 50% by weight, preferably less than 10% by weight, and preferably none of said hydrophilic units comprise —$CH_2.CH_2.O$— units.

Preferably the polymer is at least 2% soluble in water at 20° C., the solubility being of course influenced by the proportion of hydrophilic units it contains.

A key feature of the polymers used in the present invention is that they should contain pendant alkyl groups having at least 8, preferably at least 10, preferably at least 12, especially at least 16, carbon atoms in the pendant alkyl chain. These alkyl groups provide hydrophobic elements in the polymer. Preferably they are present in an amount such that the combined molecular weight of said pendant alkyl groups is in the range of from 15 to 70%, preferably from 30 to 70%, by weight based on the weight of the polymer.

Hereinafter, with reference to the polymers used in the present invention, a monomer which provides a hydrophilic unit or a functional group that is convertible into a hydrophilic grouping is referred to as a "hydrophilic monomer", and a monomer which provides a pendant alkyl group or a functional group which is convertible into a pendant alkyl group is referred to as a "hydrophobic monomer". Naturally, some monomers may have both hydrophilic and hydrophobic character.

The polymer used in the present invention may have a linear polymeric backbone or a branched polymeric backbone. Preferably, the polymeric backbone is either not cross-linked or has a low degree of crosslinking.

The polymer may be derived from a homopolymer wherein the structural units of the homopolymer are provided by a monomer having both hydrophilic units and hydrophobic units containing pendant alkyl groups (or having functional groups that are convertible into a hydrophilic unit and/or a hydrophobic unit containing a pendant alkyl group), or from a hydrophilic monomer onto which pendant alkyl groups are subsequently grafted. For example, the polymer may be a homopolymer of a higher alcohol mono-ester of maleic acid of general formula $HO(O)CCH=CHC(O)OR$ where R is a $C_8$ to $C_{40}$ alkyl group, preferably a $C_{10}$ to $C_{40}$ alkyl group, more preferably a $C_{12}$ to $C_{30}$ alkyl group, for example, monolauryl maleate, into which sulfonate groups have been introduced.

The polymer may also be a copolymer, for example a random copolymer, an alternating copolymer, or a block copolymer, comprising at least one hydrophilic monomer and at least one hydrophobic monomer. Examples of hydrophilic monomers include acrylic acid, methacrylic acid, hydroxyethylmethacrylate, hydroxypropylmethacrylate, maleic acid, maleic anhydride, fumaric acid, itaconic acid, acrylamide, N,N-dimethylacrylamide, N-vinyl pyrrolidone, 2-acrylamido-2-methylpropane sulfonic acid (AMPS), vinylsulfonic acid, and styrenesulfonic acid. Alkali metal, ammonium or amine salts of the acidic monomers may also be employed. Additional suitable sulfonated monomers include sodium allyl sulfonate and sodium methallyl sulfonate, 2-acrylamidoethane sulfonic acid, 2-acrylamidopropane sulfonic acid, 3-methacrylamidopropane sulfonic acid, and vinylbenzyl sulfonic acid.

The polymer must contain sulfonate groups. These may either be present in one of the monomers from which the polymer is made, or introduced after polymerisation, for example by starting from a hydrophilic unit comprising a carboxylic acid or anhydride group, and reacting at least a portion of the carboxylic acid or anhydride groups with a compound of general formula $R^1{}_2N(CH_2)_nSO_3X$ (I) or a compound of general formula $HO(CH_2)_nSO_3X$ (II) wherein each $R^1$ is independently selected from hydrogen, methyl or ethyl, X is either H or a Group IA metal, preferably sodium, potassium, rubidium or cesium, and n is an integer of from 1 to 6, preferably 1 to 3. Preferred reactive compounds of these types include taurine, N-methyl taurine, isethionic acid or their salts.

Preferably the ratio by weight of sulfonate groups, calculated as sulfonate ions $SO_3{}^-$, to pendant alkyl groups is at least 5:95, more preferably at least 10:90, especially at least 20:80. Preferably it is not greater than 50:50.

The presence of sulfonate groups increases the hydrophilicity of the polymer. This confers improved compatibility (solubility) of the polymer over a large range of ionic concentrations and pH values. Thus; the polymer has improved compatibility with high salinity water (for example, where the water contains sodium, calcium or magnesium salts), or in the presence of polyvalent cations, or at low pH values. Alternative methods of introducing sulfonate groups onto preformed polymers include sulfoethylation via the Michael reaction of vinylsulfonic acid with any hydroxyl or amino groups present on the polymer, or sulfomethylation via the reaction of formaldehyde and a sulfite salt with amino groups or phenolic rings that may be present in the polymer. Direct sulfonation of, for example, aromatic groups can be achieved by reacting sulfur trioxide or chlorosulfonic acid with the polymer.

An example of a monomer having a functional group that is convertible into a sulfonate group is maleic anhydride. The anhydride functional group may be reacted with a compound of general formula (I) to generate sulfonated monoamide or diamide derivatives thereof or with a compound of general formula (II) to generate sulfonated monoester or diester derivatives thereof. Further, hydrophobic monomers such as styrene may be converted into hydrophilic units by the introduction of sulfonic acid groups.

It is envisaged that a portion of the carboxylic acid groups of a carboxylated vinylic polymer (for example, acrylic acid, methacrylic acid, maleic acid, fumaric acid, or itaconic acid) may be converted into groups containing pendant alkyl groups. Thus, straight chain or branched chain alkyl groups having from 8 to 40 carbon atoms, for example 8 to 40 carbon atoms, preferably 12 to 30 carbon atoms, may be grafted onto the carboxylic acid groups of such polymers via an amide or an ester linkage. For example, an alcohol ($R^3OH$) can be reacted with the carboxylic acid groups of a polyacrylic acid to generate —$C(O)OR^3$ pendant groups (where $R^3$ is a $C_8$ to $C_{40}$ straight chain or branched chain alkyl group). Similarly, an N-alkyl amine ($R^4NH_2$) or an N,N-dialkylamine ($R^4{}_2NH$) can be reacted with the carboxylic groups of a polyacrylic acid to form an amide linkage (where $R^4$ is a $C_8$ to $C_{40}$ straight chain or branched chain alkyl group).

Examples of hydrophobic monomers include: $C_{10}$ to $C_{40}$, for example $C_{10}$ to $C_{40}$, preferably $C_{12}$ to $C_{30}$, alpha-olefins; alkyl vinyl ethers such as $C_8$ to $C_{24}$ alkyl vinyl ethers, for example $C_{10}$ to $C_{24}$ alkyl vinyl ethers, preferably $C_{12}$ to $C_{18}$ alkyl vinyl ethers; acrylamides of the general formula $CH_2=CHR^5C(O)NHR^6$ (III) where $R^5$ is selected from the group consisting of H and $C_1$ to $C_4$ alkyl groups, preferably, methyl or ethyl, and $R^6$ is a $C_8$ to $C_{40}$ alkyl group, for example a $C_{10}$ to $C_{40}$ alkyl group, preferably a $C_{12}$ to $C_{30}$ alkyl group; and acrylates of the general formula $CH_2=CHR^7C(O)OR^8$ (IV) where $R^7$ is H or methyl and $R^8$ is a $C_8$ to $C_{40}$ alkyl group, for example a $C_{10}$ to $C_{40}$ alkyl group, preferably a $C_{12}$ to $C_{30}$ alkyl group.

The polymer may comprise a copolymer of one or more hydrophobic monomers with one or more hydrophilic monomers. For example, alkyl vinyl ethers may be readily copolymerised with maleic anhydride. The hydrophobic alkyl groups introduced into the copolymer using an effective mole fraction of alkyl vinyl ether comonomer respectively confer useful properties to the maleic anhydride copolymers. However, if necessary, a portion of the anhydride groups in the resulting copolymer may be readily grafted with an alkanol or alkylamine having an alkyl group containing at least 8, for example at least 10 carbon atoms, preferably 12 to 30 carbon atoms, thereby introducing further alkyl groups into the polymer. Hydrophilic units may then be introduced by hydrolysis and ring-opening of the remaining anhydride groups thereby generating dicarboxylic acid functional groups. Preferably the dicarboxylic acid groups are neutralised to give the corresponding alkali metal, ammonium, or amine salts, and/or converted into sulfonate-containing groups.

It is also known that hydrophilic monomers such as unsaturated anhydrides (for example, maleic anhydride) and/or unsaturated carboxylic acids (for example, acrylic acid, methacrylic acid, maleic acid, fumaric acid, or itaconic acid) may be copolymerised with at least one alpha-olefin. Suitable alpha-olefins preferably have at least 10, for example at least 12, preferably at least 14, carbon atoms, and preferably have up to 30, for example up to 24, for example up to 18, carbon atoms. For example a $C_{10}$ to $C_{30}$ alpha-olefin, for example a $C_{12}$ to $C_{30}$ alpha-olefin, for example a $C_{12}$ to $C_{18}$ alpha-olefin, may be used to produce a polymer having pendant alkyl groups. However, lower alkyl ester derivatives of the unsaturated carboxylic acid (for example, methyl or ethyl ester derivatives) are more readily copolymerisable with the alpha-olefin. Accordingly, it is preferred to copolymerize the lower alkyl ester derivatives of unsaturated carboxylic acids with the alpha-olefin with subsequent hydrolysis of the ester linkage yielding the hydrophilic carboxylate groups. Unsaturated anhydrides such as maleic anhydride may be employed as monomers without esterification. For example, 1-dodecene and 1-octadecene are copolymerisable with maleic anhydride to produce a polymer having pendant alkyl groups. As described above, sulfonate groups may then be introduced into the polymer, if desired along with other hydrophilic groups, for example by hydrolysis and ring-opening of the anhydride groups thereby generating dicarboxylic acid groups or, preferably, alkali metal, ammonium, or amine salts of the dicarboxylic acid groups. Preferably, the anhydride groups may be reacted with a compound of general formula (I) or (II). Particularly preferred polymers of this class include sulfonated derivatives of copolymers, for example alternating copolymers, of maleic anhydride and a $C_{10}$ to $C_{30}$, for example a $C_{12}$ to $C_{30}$, alpha-olefin. Commercially available mixtures of $C_{10}$ to $C_{30}$ alpha-olefins, for example a $C_{16}$-$C_{18}$-$C_{20}$ mixture, may for example be used to prepare such polymers. Typical polymers include poly(maleic anhydride-alt-dodecene); poly(maleic anhydride-alt-tetradecene); poly(maleic anhydride-alt-hexadecene); poly(maleic anhydride-alt-octadecene); poly(maleic anhydride-alt-1-eicosene); poly(maleic anhydride-alt-1-docosene) and poly(maleic anhydride-alt-α-olefin, $C_{24}$-$C_{28}$). The corresponding random or block copolymers may also be mentioned. In such copolymers, the molar ratio of alpha olefin to maleic anhydride is preferably in the range of from 30:70 to 70:30.

Particularly suitable materials include:
1. Poly(maleic anhydride-alt-tetradecene) as supplied by Aldrich (average molecular weight 9,000);
2. Poly(maleic anhydride-alt-octadecene); sold by Chevron Phillips Chemical Company as "PA-18 Polyanhydride Resin" (average molecular weights of about 20,000 (LV version) and 50,000 (HV version);
3. Poly(maleic anhydride-alt-α-olefin, $C_{24}$-$C_{28}$); average molecular weight 6,400.

Hydrophilic monomers such as unsaturated anhydrides (for example maleic anhydride) and/or unsaturated carboxylic acids (for example, acrylic acid, methacrylic acid, maleic acid, fumaric acid, and itaconic acid) may also be copolymerised with at least one acrylamide monomer of general formula (III) and/or at least one acrylate ester monomer of general formulae (IV). Preferred acrylamide monomers include N-dodecyl acrylamide, N-dodecyl methacrylamide, N-hexadecyl acrylamide, N-hexadecyl methacrylamide, N-octadecyl acrylamide and N-octadecyl methacrylamide. Preferred acrylate ester monomers include dodecylmethacrylate, hexadecyl methacrylate and octadecyl methacrylate. For anhydride-containing copolymers, hydrophilic groups may then be introduced into the polymer by hydrolysis and ring-opening of the anhydride groups thereby generating dicarboxylic acid groups or, preferably, alkali metal, ammonium, or amine salts of the dicarboxylic acid groups, and sulfonate groups may be introduced as desired. Preferably, pendant sulfonate groups may be introduced into the polymer by reacting the anhydride groups with a compound of general formula (I) or (II). Sulfonated derivatives of alpha olefin/maleic anhydride copolymers such as PA-18 display excellent performance in wellbore fluid formulations.

The polymer may be an amphiphilic block copolymer having at least one polymeric block having structural units derived from a hydrophobic monomer containing pendant $C_{8+}$ alkyl, especially $C_{10+}$ alkyl, groups and at least one polymeric block having structural units derived from a hydrophilic monomer. The block copolymer may be a di-, tri-, or multi-block copolymer. Typically, the block copolymer is an AB block copolymer, an ABA block copolymer or an ABC block copolymer. Where the polymer is an ABA block copolymer the A blocks may be hydrophobic and the B block hydrophilic or the A blocks may be hydrophilic and the B block hydrophobic.

The number of pendant alkyl groups incorporated into the polymer is chosen so that the polymer is not overly hydrophobic. Suitably, the hydrophile-lipophile balance (HLB) value of the polymer is at least 7, preferably at least 8, and most preferably at least 10 (HLB is a well-known scale that characterizes emulsifiers in terms of their tendency to form oil in water or water in oil emulsion). Although there is no set or fixed upper limit to the HLB value, the polymer preferably has an HLB value of 40 or less.

In one embodiment, the present invention provides a wellbore fluid having a continuous aqueous phase, and comprising at least one polymer which:
has a molecular weight in the range of from 2,000 to less than 100,000;
contains hydrophilic units such that the polymer is at least 2% soluble in water at 20° C., and such that less than 50% by weight of said hydrophilic units comprise —$CH_2.CH_2.O$— units, at least some of said hydrophilic units containing sulfonate groups; and contains pendant alkyl groups having at least 10 carbon atoms, the combined molecular weight of said pendant alkyl groups being in the range of from 15 to 70% by weight based on the weight of the polymer.

The concentration of the polymer in the aqueous wellbore fluid according to the invention is not critical, and may for example be from 0.1 to 20% by weight based on the total weight of the aqueous phase or, in the case of an oil-in-water emulsion, the combined aqueous and oil phases, in the absence of any weighting agents or other constituents of the fluid. Preferably however, for economic and Theological reasons, a relatively low content of polymer is used. When the fluid is an oil-in-water emulsion, the content of polymer is preferably from 0.1 to 8 percent by weight, preferably 0.5 to 6 percent by weight, whereas when the fluid is purely water based, the content of polymer is preferably from 0.1 to 10 percent by weight, preferably 0.5 to 8 percent by weight.

If desired, two or more of the defined polymers may be present.

The fluid of the invention is suitably free from polyethylene.

The fluid of the invention has a continuous aqueous phase. Thus, it may be either a purely aqueous based fluid, or an oil-in-water emulsion, i.e. an emulsion in which water is the continuous phase, and any oil present is present as a dispersion of oil droplets in the water. The polymers used in the invention, having both hydrophilic and hydrophobic units, will have emulsifier and surfactant properties. In the case of an oil-in-water emulsion, the polymer tends to act as an emulsifier, and stabilises the droplets of oil in the continuous aqueous phase. Minor amounts of at least one conventional emulsifier for an oil-in-water emulsion may additionally be present if desired, but preferably the defined polymer is the only emulsifier or surfactant present in the fluid of the invention, whether the fluid is an emulsion or an entirely aqueous system. Suitable conventional emulsifiers would be well known to the person skilled in the art.

In a water-based fluid, and especially when the fluid is a purely water based fluid, the polymer will tend to form micelles, and the critical micelle concentration (CMC) is the minimum concentration at which the polymer molecules begin to aggregate to form micelles. Where the micelles are dispersed in water or an aqueous solution, the polymer molecules are arranged such that their hydrophilic head groups lie on the surface of the micelle and the lipophilic tail groups are in the interior of the micelles. Typically, the molecules are first found to associate in spherical clusters, which with increasing concentrations become rod-like. At still higher concentrations, the molecules may aggregate to form vesicles i.e. spherical or spheroidal bodies containing an aqueous phase bounded by a bilayer. Typically, the vesicles may be multiple vesicles which contain one or more smaller vesicles, in particular, concentric multiple vesicles. Alternatively, the surfactant molecules may aggregate to form lamellar structures in which a plurality of bilayers are arranged in a substantially parallel array of indefinite extent, separated by layers of water or an aqueous solution. The present of such microstructures is beneficial, and thus the polymer is suitably present in a purely aqueous wellbore fluid according to the invention at a sufficient concentration to form micelles, either spherical or rod shaped micelles. It is also envisaged that the polymer may be present in the aqueous solution at a sufficient concentration to form vesicles or lamellar structures. A similar scenario obtains in the case of an oil-in-water emulsion fluid except that a portion of the polymer is adsorbed at the interface of the oil droplets.

Typically, the wellbore fluid is a drilling fluid, completion fluid, workover fluid or packer fluid, preferably a drilling fluid. Incorporation of the defined polymer leads to reduced fluid loss when using the wellbore fluids of the invention, and the fluids of the invention may be characterised as being ultra-low fluid loss wellbore fluids. Fluid loss may be determined using a high temperature high pressure (HTHP) fluid loss test, according to the specifications of the American Petroleum Institute (API) as detailed in "Recommended Practice Standard Procedure for Field Testing Water-Based Drilling Fluids", API Recommended Practice 13B-I Second Edition, September 1997, Section 5.3.1 to 5.3.2. The test employs a pressurized cell fitted with a standard hardened filter paper as a filtration medium. The filtration area is 7.1 square inches (0.0045 $m^2$) or may be smaller. If smaller, the result reported is corrected to a filter area of 7.1 square inches. For instance the filtrate volume using a 3.55 square inches (0.0023 $m^2$) filter area is doubled to provide the corrected result. Generally, the filtration behaviour of the wellbore fluid in the HTHP test is determined with a pressure differential across the filter paper of 500 psi ($3.45 \times 10^6$ Pa). Suitably, the temperature at which the HTHP fluid loss test is carried out may be varied to correspond to the downhole temperature. Generally, the test temperature is in the range 50 to 150° C. A filter cake is allowed to build up on the filter paper for 30 minutes and the volume of filtrate collected during this 30 minute period is then recorded.

Preferably, the defined polymer is incorporated in the wellbore fluid according to the invention in an amount effective to achieve an HTHP fluid loss value, when the test is performed at a temperature of 250° F. (121° C.) and a differential pressure of 500 psi, of less than 7 ml/30 minutes, preferably less than 5 ml/30 minutes, more preferably less than 2 ml/30 minutes. An advantage of the ultra-low fluid loss wellbore fluid of the present invention is that the reduced invasion of the fluid into the formation decreases formation damage.

Where the fluid of the invention takes the form of an oil-in-water emulsion, the discontinuous oil phase of the fluid may for example be a crude oil, a refined petroleum fraction, a mineral oil, a synthetic hydrocarbon, or any non-hydrocarbon oil that is capable of forming a stable emulsion with the continuous aqueous phase. Preferably, such a non-hydrocarbon oil is biodegradable and is therefore not associated with ecotoxic problems. It is particularly preferred that the non-hydrocarbon oil has a solubility in water at room temperature of less than 2% by weight, preferably, less than 1.0% by weight, most preferably, less than 0.5% by weight.

In an emulsion, the oil phase is for example dispersed in the continuous aqueous phase in an amount of from 1 to 65% by volume, preferably 2.5 to 40% by volume, most preferably 10 to 35% by volume based on the total volume of the aqueous and oil phases. Generally, the oil phase is distributed in the aqueous phase in the form of finely divided droplets. Suitably, the droplets of oil phase have an average diameter of less than 40 microns, preferably between 0.5 and 20 microns, and most preferably between 0.5 and 10 microns.

Suitably, the discontinuous oil phase may be a synthetic hydrocarbon or a non-hydrocarbon oil selected from the group consisting of polyalkylene glycols, esters, acetals, ethers and alcohols.

Suitable polyalkylene glycols include polypropylene glycols (PPG), polybutylene glycols, polytetrahydrofurans, and polyalkylene glycols produced by the polycondensation of 1,3 propane diol or by the polymerization of trimethylene oxide. Preferably, the molecular weight of the polyalkylene glycol should be sufficiently high that the polyalkylene glycol has a solubility in water at room temperature of less than 2% by weight. The polyalkylene glycol may also be a copolymer of at least two alkylene oxides. Suitably, ethylene oxide may be employed as a comonomer provided that the mole percent of units derived from ethylene oxide is limited such that the solubility of the copolymer in water at room temperature is less than 2% by weight. The person skilled in the art would be able to readily select polyalkylene glycols that exhibit the desired low-water solubility.

Suitable esters include esters of unsaturated fatty acids and saturated fatty acids as disclosed in EP 0374671A and EP 0374672 respectively; esters of neo-acids as described in WO 93/23491; oleophilic carbonic acid diesters having a solubility of at most 1% by weight in water (as disclosed in U.S. Pat. No. 5,461,028); triglyceride ester oils such as rapeseed oil (see U.S. Pat. No. 4,631,136 and WO 95/26386. Suitable acetals are described in WO 93/16145. Suitable synthetic hydrocarbons include polyalphaolefins (see, for example, EP 0325466A, EP 0449257A, WO 94/16030 and WO 95/09215); isomerized linear olefins (see EP 0627481A, U.S. Pat. Nos. 5,627,143, 5,432,152 and WO 95/21225); n-paraffins, in particular n-alkanes (see, for example, U.S. Pat. Nos. 4,508,628 and 5,846,913); linear alkyl benzenes and alkylated cycloalkyl fluids (see GB 2,258,258 and GB 2,287,049 respectively). Suitable ethers include those described in EP 0391251A (ether-based fluids) and U.S. Pat. No. 5,990,050 (partially water-soluble glycol ethers). Suitable alcohols include oleophilic alcohol-based fluids as disclosed in EP 0391252A.

Preferably the fluid according to the invention is an entirely water-based system, in which case the carrier fluid comprises a solution of the polymer in water, insubstantial amounts, or no, oil being present.

The water in the fluid of the invention may be fresh water, brackish water, seawater, or a synthetic brine containing one or more salts. As would be well known to the person skilled in the art, the salt should be compatible with the polymer, for example, should not form an insoluble precipitate with the polymer. Suitable salts include alkali metal halides, alkali metal carbonates, alkali metal sulphates, alkali metal formates, alkali metal phosphates, alkali metal silicates, alkaline earth metal halides, and zinc halides. The salt may be present in the aqueous solution at concentrations up to saturation. It is known that the CMC of an aqueous solution may be adjusted by altering the salinity of the aqueous solution. Thus, the higher the salinity of the aqueous solution the lower the CMC. Accordingly, a salt, particularly a salt of a monovalent cation, may be added to the aqueous solution to lower the CMC and hence increase the number of micelles, vesicles or lamellar structures. Preferably, the salt in a brine is present at a concentration in the range 0.5 to 25% by weight, for example, in the range 3 to 15% by weight, based on the total weight of the brine.

Suitably, the specific gravity of the wellbore fluid is in the range 0.9 to 2.5, typically in the range 1.0 to 2.0.

Preferably, the wellbore fluid additionally comprises at least one additional fluid loss control agent. As would be well known to the person skilled in the art, the fluid loss from a wellbore fluid, especially a drilling fluid, may be reduced to some extent by incorporating conventional fluid loss control agents in the fluid. Suitable known fluid loss control agents that may be incorporated in the ultra-low fluid loss fluid of the present invention include organic polymers of natural and/or synthetic origin. Suitable polymers include starch or chemically modified starches; cellulose derivatives such as carboxymethylcellulose and polyanionic cellulose (PAC); guar gum and xanthan gum; homopolymers and copolymers of monomers selected from the group consisting of acrylic acid, acrylamide, acrylamido-2-methyl propane sulfonic acid (AMPS), styrene sulphonic acid, N-vinyl acetamide, N-vinyl pyrrolidone, and N,N-dimethylacrylamide wherein the copolymer has a number average molecular weight of from 100,000 to 1,000,000; asphalts (for example, sulfonated asphalts); gilsonite; lignite (humic acid) and its derivatives; lignin and its derivatives such as lignin sulfonates or condensed polymeric lignin sulfonates; and combinations thereof. Any of these polymers that contain acidic functional groups are preferably employed in the neutralised form e.g. as sodium or potassium salts. As an alternative to, or in addition to, employing such additives, the fluid loss when using a drilling fluid may be reduced by adding finely dispersed particles such as clays (for example, illite, kaolinite, bentonite, hectorite or sepiolite) to the fluid. Without wishing to be bound by any theory, it is believed that a filter cake comprised of fluid loss additives and/or finely divided clay particles will build up on the wellbore wall and/or will bridge fractures present in the wellbore wall. These fractures may be naturally occurring or may be induced during the drilling of the wellbore. It is believed that the filter cake will additionally comprise fluid droplets and other solids that are present in the drilling fluid such as drill cuttings.

Preferably, a bridging particulate material is added to an ultra-low fluid loss drilling fluid of the present invention in order to assist in the formation of a filter cake and to assist in bridging the fractures. Suitably, the bridging particulate material comprises at least one substantially crush resistant particulate, solid. Preferred bridging particulate materials for adding to the fluid include graphite, calcium carbonate, celluloses, micas, proppant materials such as sands or ceramic particles and combinations thereof. These materials are very inert and are environmentally acceptable. Suitably, the bridging particulate material is sized so as not to enter the pores of any permeable rock through which the wellbore is being drilled. Typically, the bridging material has an average particle diameter in the range 25 to 2000 microns, preferably 50 to 1500 microns, more preferably 250 to 1000 microns. The bridging material may comprise substantially spherical particles. However, it is also envisaged that the bridging material may comprise elongate particles, for example, fibres. Preferably, the bridging material has a broad (polydisperse) particle size distribution.

Finely-dispersed additives for increasing the fluid density may also be incorporated. Suitable additives for increasing the fluid density include barium sulfate (barite), calcium carbonate (calcite), the mixed carbonate of calcium and magnesium (dolomite), hematite and mixtures thereof.

Optionally, the fluid of the present invention may comprise thinners (dispersants) for viscosity regulation. So-called thinners can be of organic or inorganic nature; examples of organic thinners are tannins and/or quebracho extract. Further examples are lignin and lignin derivatives, particularly lignosulfonates. Other useful dispersants include synthetic water-soluble polyanionic polymers such as sodium polyacrylate having a number average molecular weight, $M_n$, in the range 1,000 to 100,000, preferably 5,000 to 50,000. Polyphosphate compounds are examples of inorganic thinners. Of course, thinners may have a dual function acting both as a thinner and a fluid loss additive. Thus, the thinner (dispersant) may act by dispersing the solids contained in a drilling fluid which assists in the formation of a low permeability filter cake thereby reducing fluid loss. The thinner may also act directly to reduce fluid loss by sealing the wellbore wall.

Preferably, the plastic viscosity of the fluid of the present invention is in the range 1 to 100 mPa·s. Preferably, the yield point is between 2 and 50 Pa.

Optionally, the fluid composition, especially a drilling fluid, may comprise additives which inhibit undesired water-exchange with, for example, clays. Any of the known additives for use in water-based drilling fluids may be employed. Suitable additives include halides, formates, sulphates, phosphates, carbonates and silicates of the alkali metals, or the halides of the alkaline earth metals and zinc, with particular importance given to potassium salts, optionally in combination with lime. Reference is made, for example, to the appropriate publications in "Petroleum Engineer International", September 1987, 32-40 and "World Oil", November 1983, 93-97. As would be well known to the person skilled in the art, other so-called shale inhibitors may be added to the drilling fluid to stabilise clays and shales including polyacrylamides and polyamines.

The quantity of auxiliary substances and additives used in each case lie within the usual boundaries for a drilling fluid.

An advantage associated with an ultra-low fluid loss drilling fluid of the present invention is that the low fluid loss may strengthen the wellbore wall by the solids contained therein bridging cracks and fissures thereby increasing the hoop stress. A further advantage of the ultra-low fluid loss drilling fluid is that the reduction in the fluid loss reduces the filter cake thickness thereby reducing the incidence of differential sticking.

According to a further embodiment of the present invention there is provided a method of carrying out a wellbore operation using a circulating water-based wellbore fluid, the method comprising circulating in the wellbore a water-based wellbore fluid according to the invention. Wellbore operations include drilling, completion and workover. A still further embodiment provides the use of a polymer which contains both hydrophilic units and hydrophobic units, at least some of said hydrophilic units containing sulfonate groups, and less than 50% by weight of said hydrophilic units comprising —CH$_2$.CH$_2$.O— units; and at least some of said hydrophobic units containing pendant alkyl groups having at least 8 carbon atoms; as a fluid-loss control agent in a wellbore fluid having an aqueous continuous phase in a wellbore operation. The invention further provides the use of a polymer which:

has a molecular weight in the range of from 2,000 to less than 100,000;
contains hydrophilic units such that the polymer is at least 2% soluble in water at 20° C., and such that less than 50% of said hydrophilic units comprise —CH$_2$.CH$_2$.O— units, at least some of said hydrophilic units containing sulfonate groups; and
contains pendant alkyl groups having at least 10 carbon atoms, the combined molecular weight of said pendant alkyl groups being in the range of from 15 to 70% by weight based on the weight of the polymer;

as a fluid-loss control agent in a wellbore fluid having an aqueous continuous phase in a wellbore operation.

The fluid of the present invention may also be employed in the method of reducing formation breakdown during the drilling of a wellbore through a formation with a circulating drilling fluid that is described in U.S. Pat. No. 7,431,106 which is herein incorporated by reference. Thus, the drilling fluid that is circulating in the wellbore is preferably selected so as to have a fluid loss value of less than 2 ml/30 minutes (measured according to the high temperature high pressure API fluid loss test described in U.S. Pat. No. 7,431,106). Prior to encountering formation breakdown, a solid particulate material having an average particle diameter of 25 to 2000 microns is added to the drilling fluid in a concentration of at least 0.5 pounds per barrel, preferably at least 10 pounds per barrel, more preferably, at least 15 pounds per barrel. Thereafter drilling is continued through the formation with the pressure in the wellbore maintained at above the initial fracture pressure of the formation.

The present invention will now be illustrated by reference to the following Examples.

Materials

Polymer precursor: Poly(maleic anhydride-alt-1-octadecene) obtained from Chevron Phillips Chemical LLC under the trademark PA-18 HV LC; average molecular weight (Mn) 40,000-50,000).

PPG 2000: polypropylene glycol; average molecular weight (Mn) 2000.

Xanthan gum: Duovis™ ex Schlumberger.

Drill-Thin™: a powdered dispersant, ex Drilling Specialties Inc. that contains 70+% sulphomethylated quebracho.

Hymod Prima (HMP): a powdered ball clay ex Imerys Minerals Ltd. This clay was used to replicate dispersed clay solids that accumulate in a drilling mud when drilling through clay-rich sediments.

Barite: API grade (drilling fluid grade) barium sulphate powder, ex M-I Drilling Fluids UK Ltd.

Caustic Soda: used to adjust the final pH of the fluids to pH 10.0.

Units

The following U.S. to metric unit conversion factors were used in the examples:

1 US gallon (gal)=3.785 liters.
1 lb=0.454 kg
1 lb/gal (ppg)=0.1198 g/cm$^3$
1 barrel (bbl)=42 gal
1 lb/bbl (ppb)=2.835 kg/m3
1 lb/100 ft$^2$=0.4788 Pascal (Pa)
1 lb/sq.in. (psi)=6.895×10$^3$ Pa Test Methods The Fluid Formulations were tested in accordance with ISO 10416: 2002 (API RP 13I 7th edition).

EXAMPLES 1 to 4

To 30.29 g of taurine was added 10 g of deionised water plus 10 g of NaOH in another log of water. The resulting solution was evaporated down to a 70% w/w sodium taurate solution, which was kept warm to avoid crystallisation.

35 g of PA-18 HV LC powder were added to 70 g of N-methyl-2-pyrrolidone (NMP) in a beaker, and dissolved by stirring and heating on a magnetic stirrer/hotplate maintaining the beaker contents at 65° C. 2 g of the 70% sodium taurate solution were added to the hot stirred solution and the temperature was maintained at 65-70 C for three hours. 3.8 g of NaOH were dissolved in 100 g of deionised water and mixed with the polymer solution to hydrolyse and partially neutralise the remaining anhydride groups. After dissolution was complete, 400 ml of methanol was added. The resulting flocculent white solid was vacuum filtered and the filter cake was washed with methanol. The solids were then vacuum dried, and 40 g of product recovered. The product was ground and sieved so that the powder passed a 500 micron screen. The product was "Taurine 10", in which 10% of the anhydride groups in PA-18 had been converted into sulphonate groups.

The above method was then repeated except that 6 g of 70% sodium taurate solution was added, and during the subsequent neutralisation step, 3.4 g NaOH was used. The product was "Taurine 30", in which 30% of the anhydride groups in PA-18 had been converted into sulphonate groups.

Taurine 10 and Taurine 30 were used to prepare model drilling fluid compositions. Distilled water and Drill Thin were mixed, the pH was adjusted to 10 with NaOH, and the mixture was mixed at high shear for 20 mins. The remaining ingredients were added, and the final pH adjusted to 10.0 with NaOH. The compositions were tested as described above. The contents of the test compositions (g) and the results are given in the following Table.

|  | 1 | 2 | 3 | 4 |
|---|---|---|---|---|
| Dist. water | 128 | 128 | 128 | 128 |
| Drill Thin | 12.5 | 12.5 | 12.5 | 12.5 |
| "Taurine 10" | 10 | 10 | | |
| "Taurine 30" | | | 10 | 10 |
| KCl | 7.5 | | 7.5 | |
| NaCL | | 7.5 | | 7.5 |
| Duovis | 0.27 | 0.27 | 0.27 | 0.27 |
| HMP | 12.5 | 12.5 | 12.5 | 12.5 |
| Barite | 72 | 72 | 72 | 72 |
| PV(cP at 20° C.) | 28 | 32 | 30 | 32 |
| YP(lbs/100 ft$^2$ (Pa) at 20° C.) | 22 (10.7) | 26 (12.7) | 20 (9.8) | 24 (11.7) |
| API FL (ml) | 2.0 | 0.9 | 1.5 | 0.66 |
| HTHP FL ml (250° F. (121° C.), 500 psi 3.45 × 10$^6$ Pa), 30 mins) | 8.4 | 5.2 | 6.0 | 4.4 |

The results show excellent low plastic viscosity and low fluid loss.

EXAMPLES 5-7

A series of taurine-modified derivatives of the PA-18 polyanhydride was synthesised using a similar method to that used in Examples 1-4 except that the NMP solvent was replaced by dichloroethane. For the first sample sufficient taurine was added to substitute 20% of the anhydride groups with one mole of taurine. Samples were also prepared at 85% and 100% substitution of the anhydride groups. The polyanhydride derivatives were designated PAD 20, PAD 85 and PAD 100.

These samples were tested in a higher salinity drilling fluid formulation containing 10% by weight KCl dissolved in the aqueous phase in order to indicate the degree of taurine substitution required for such higher salinity fluids. Three drilling fluid samples were prepared containing the varying PAD samples according to the following formulation.

| Component | Weight (g) |
|---|---|
| Deionised water | 242 |
| Orfom Grade 3 Tannin ™ | 15 |
| pH adjusted to 10.0 using NaOH solution | |
| sample mixed for 15 minutes | |
| PAD sample under test | 13.5 |
| PPG 2000 | 27 |
| Xanthan gum | 0.7 |
| HMP (API Clay) | 25 |
| Barite | 144 |
| KCl | 27 |
| Final pH to 10 (NaOH) | 10 |

After mixing together the components of each fluid, the fluids were hot-rolled for 16 hours at a temperature of 250° F. (121° C.). This involved placing the fluids into steel containers, purging the containers with nitrogen gas and rotating the containers at about 20 rpm inside an oven for the prescribed period. The plastic viscosity. (PV), yield point (YP) and fluid loss of the fluids were then tested.

Results after hot rolling:

| | Example | | |
|---|---|---|---|
| | 5 | 6 | 7 |
| | | PAD sample | |
| | PAD 20 | PAD 85 | PAD100 |
| PV (cP) | 21 | 23 | 25 |
| YP(lbs/100 ft$^2$(Pa) | 17 (8.3) | 12 (5.8) | 12 (5.8) |
| 6 rpm | 4 | 4 | 4 |
| 3 rpm | 3 | 3 | 3 |
| API FL (ml) | 14.0 | 9.9 | 3.9 |
| HTHP FL (ml) | not tested | 10.0 | 3.6 |

Clearly high taurine substitution is desirable to provide low fluid loss in higher salinity fluids. As such salinities are commonly required in drilling fluids, amphiphilic polymers containing substantial proportion of sulfonate functional groups are a preferred embodiment of this invention.

EXAMPLE 8

Comparative

A comparative fluid was prepared having the following composition:

| Deionised water | 250 g (includes the water from the PA18 stock solution) |
|---|---|
| K$_2$HPO$_4$ | 25 g |
| PPG 2000 | 100 g |
| Xanthan gum | 0.5 g |
| Drill-Thin | 20 g |
| Hymod Prima | 35 g |
| Barite | 200 g |

After mixing the components, the fluid was hot-rolled for 16 hours at a temperature of 250° C. (121° C.), and tested. The results are shown in the following Table:

| PV, cP | 24 |
|---|---|
| YP, lbs/100 sq ft (Pa) | 4 (1.9) |
| API fluid loss (mls in 30 minutes) | 30 |
| HTHP fluid loss (250° F. (121° C.) and 500 psi (3.45 × 10$^6$ Pa) differential pressure) | 20 |

The invention claimed is:

1. A wellbore fluid having a continuous aqueous phase, and comprising:
   (a) at least one polymer which has a number average molecular weight in the range of from 10,000 to less than 100,000, wherein the polymer is selected from
   a copolymer of at least one hydrophilic monomer and at least one hydrophobic monomer containing an alkyl group having at least 8 carbon atoms, wherein the hydrophilic monomer is selected from acrylic acid, methacrylic acid, maleic acid, maleic anhydride, fumaric acid and itaconic acid, and wherein sulfonate groups have been introduced into the copolymer by reaction of at

15 least a portion of the carboxylic acid and/or anhydride groups with a compound of general formula $R^1_2N(CH_2)_n\,SO_3X$ (I) or a compound of general formula $HO(CH_2)_n\,SO_3X$ (II) wherein each $R^1$ is independently selected from hydrogen, methyl or ethyl, X is either H or a Group IA metal, and n is an integer of from 1 to 6, and wherein the combined molecular weight of the pendant alkyl groups that are introduced into the copolymer by the hydrophobic monomer is in the range of from 15 to 70% by weight based on the molecular weight of the polymer such that the polymer has a solubility of at least 2% in water at 20° C.; and (b) at least one additive selected from the group consisting of additional fluid loss control agents, bridging particulate materials, finely dispersed additives for increasing the fluid density, thinners, and shale inhibitors.

2. A wellbore fluid as claimed in claim 1, in which said polymer has a number average molecular weight in the range of 10,000 to less than 60,000.

3. A wellbore fluid as claimed in claim 2, in which said polymer has a number average molecular weight in the range of from 10,000 to 55,000.

4. A wellbore fluid as claimed in claim 1, in which the hydrophobic monomer of the copolymer is at least one alpha olefin having at least 10 carbon atoms and up to 30 carbons atoms.

5. A wellbore fluid as claimed in claim 4, in which the polymer is a copolymer of maleic anhydride and dodecene; tetradecene; hexadecene; octadecene; 1-eicosene; 1-docosene; or a $C_{24}$-$C_{28}$ alpha-olefin; into which sulfonate groups have been introduced by reaction with of at least a portion of the anhydride groups of the copolymer with said compound of formula I or II.

6. A wellbore fluid as claimed in claim 4, in which said polymer is a poly(maleic anhydride-alt-tetradecene) copolymer, a poly(maleic anhydride-alt-α-olefin, $C_{24}$-$C_{28}$) copolymer, a poly(maleic anhydride-alt-hexadecene) copolymer and a poly(maleic anhydride-alt-octadecene) copolymer, into which sulfonate groups have been introduced by reaction of at least a portion of the anhydride functional groups of the copolymer with said compound of formula I or II.

7. A wellbore fluid as claimed in claim 1, in which said pendant alkyl groups have at least 10 carbon atoms.

8. A wellbore fluid as claimed in claim 7, in which said polymer contains pendant alkyl groups having at least 16 carbon atoms.

9. A wellbore fluid as claimed in claim 1, comprising an oil-in-water emulsion comprising a discontinuous oil phase and a continuous aqueous phase wherein the discontinuous oil phase of the fluid is a crude oil, a refined petroleum fraction, a mineral oil, a synthetic hydrocarbon, or a non-hydrocarbon oil selected from the group consisting of polyalkylene glycols, esters, acetals, ethers and alcohols, wherein the biodegradable non-hydrocarbon oil has a solubility in water a room temperature of less than 2% by weight.

10. A wellbore fluid as claimed in claim 9, in which the oil phase is dispersed in the continuous aqueous phase in an amount of from 1 to 65% by volume.

11. A wellbore fluid as claimed in claim 1, in which said polymer is such that the viscosity of a 5% by weight solution of the polymer in fresh water at a temperature of 20° C. and at a pH between 10 and 12 is no greater than 50 cP as measured using a Fann 35 rheometer at 300 rpm rotor speed.

12. A wellbore fluid as claimed in claim 1, wherein the hydrophobic monomer of the copolymer (a) is selected from the group consisting of $C_{10}$ to $C_{40}$ alpha-olefins; $C_8$ to $C_{24}$ alkyl vinyl ethers; acrylamides of the general formula $CH_2{=}CHR^5C(O)NHR^6$ (III) where $R^5$ is selected from the group consisting of H and $C_1$ to $C_4$ alkyl groups and $R^6$ is a $C_8$ to $C_{40}$ alkyl group; and acrylates of the general formula $CH_2{=}CHR^7C(O)OR^8$ (IV) where $R^7$ is H or methyl and $R^8$ is a $C_8$ to $C_{40}$ alkyl group.

13. A wellbore fluid as claimed in claim 1, in which the compound of general formula (1) or (II) that is reacted with at least a portion of the carboxylic acid groups of homopolymer (a) or at least a portion of the carboxylic acid and/or anhydride groups of copolymer (c) is selected from the group consisting of taurine, N-methyl taurine, isethionic acid or a salt thereof.

14. A wellbore fluid as claimed in claim 1 in which said polymer is a copolymer of maleic anhydride with a $C_8$ to $C_{24}$ alkyl vinyl ether into which sulfonate-containing groups have been introduced by reaction of at least a portion of the anhydride groups of the copolymer with said compound of formula I or II.

15. A wellbore fluid as claimed in claim 1, in which said polymer is a copolymer of maleic anhydride with at least one acrylamide monomer of general formula $CH_2{=}CHR^5C(O)NHR^6$ (III) where $R^5$ is selected from the group consisting of H and $C_1$ to $C_4$ alkyl groups and R is a $C_8$ to $C_{40}$ alkyl group; and/or at least one acrylate ester monomer of the general formula $CH_2{=}CHR^7C(O)OR^8$ (IV) where $R^7$ is H or methyl and $R^8$ is a $C_8$ to $C_{40}$ alkyl group, in which pendant sulfonate groups have been introduced into the polymer by reacting at least some of the anhydride groups with a compound of general formula (I) or (II) as defined in claim 1, and optionally, additional hydrophilic groups have been introduced into the polymer by hydrolysis and ring-opening of some of the anhydride groups.

16. A wellbore fluid as claimed in claim 1, in which said polymer contains acid groups which are present in the form of an alkali metal, ammonium or amine salt.

17. A wellbore fluid as claimed in claim 1, which comprises a solution of said polymer in water, no oil being present.

18. A wellbore fluid as claimed in claim 1, which has a plastic viscosity in the range 1 to 100 mPa·s.

19. A wellbore fluid as claimed in claim 1, in which said polymer contains pendant alkyl groups having at least 10 carbon atoms, the combined molecular weight of said pendant alkyl groups being in the range of from 15 to 70% by weight based on the weight of the polymer.

20. A method of carrying out a wellbore operation using a circulating water-based wellbore fluid, the method comprising circulating in the wellbore a wellbore fluid having a continuous aqueous phase, and comprising (a) at least one polymer which has a number average molecular weight in the range of from 10,000 to less than 100,000, wherein the polymer is selected from a copolymer of at least one hydrophilic monomer and at least one hydrophobic monomer containing an alkyl group having at least 8 carbon atoms, wherein the hydrophilic monomer is selected from acrylic acid, methacrylic acid, maleic acid, maleic anhydride, fumaric acid and itaconic acid, and wherein sulfonate groups have been introduced into the copolymer by reaction of at least a portion of the carboxylic acid and/or anhydride groups with a compound of general formula $R^1_2N(CH_2)_n\,SO_3X$ (I) or a compound of general formula $HO(CH_2)_n\,SO_3X$ (II) wherein each $R^1$ is independently selected from hydrogen, methyl or ethyl, X is either H or a Group IA metal, and n is an integer of from 1 to 6, and wherein the combined molecular weight of the pendant alkyl groups that are introduced into the copolymer by the hydrophobic monomer is in the range of from 15 to 70% by weight based on the molecular weight of the polymer such that the polymer has a solubility of at least 2% in water at 20° C.; and (b) at least one additive selected from the group consisting of additional fluid loss control agents, bridging particulate materials, finely dispersed additives for increasing the fluid density, thinners, and shale inhibitors.

21. A method as claimed in claim 20 wherein the water-based wellbore fluid is circulated in the wellbore during the drilling of the wellbore.

* * * * *